(12) United States Patent
Caretta

(10) Patent No.: US 6,332,999 B1
(45) Date of Patent: Dec. 25, 2001

(54) METHOD AND APPARATUS FOR MOULDING AND CURING TIRES FOR VEHICLE WHEELS

(75) Inventor: Renato Caretta, Gallarate (IT)

(73) Assignee: Pirelli Pneumatici S.p.A., Milan (IT)

(*) Notice: Subject to any disclaimer, the term of this patent is extended or adjusted under 35 U.S.C. 154(b) by 0 days.

(21) Appl. No.: 09/365,242

(22) Filed: Jul. 30, 1999

Related U.S. Application Data

(60) Provisional application No. 60/108,887, filed on Nov. 17, 1998.

(30) Foreign Application Priority Data

Jul. 31, 1998 (EP) .................................................. 98830473

(51) Int. Cl.[7] ............................ B29D 30/06; B29C 35/00
(52) U.S. Cl. ...................... 264/501; 156/110.1; 156/414; 264/326; 425/44; 425/49
(58) Field of Search .................................. 264/501, 325, 264/326, 502; 425/44, 49, 51, 54; 156/110.1, 123, 130.5, 394.1, 414, 421.6

(56) References Cited

U.S. PATENT DOCUMENTS

| | | |
|---|---|---|
| 1,328,676 | 1/1920 | Krannich . |
| 1,798,210 | 3/1931 | Laursen . |
| 4,561,927 | * 12/1985 | Sumner ................................... 425/51 |

FOREIGN PATENT DOCUMENTS

| | | |
|---|---|---|
| 0242840 | 10/1987 | (EP) . |
| 0780221 | 6/1997 | (EP) . |
| 0822047 | 2/1998 | (EP) . |

OTHER PUBLICATIONS

English Language Abstract of EP 0,822,047.
English Language Abstract of US 4,895,692; Requested Patent No. EP 0,242,840.
European Search Report, Dec. 29, 1998, EP 98 83 0473.

* cited by examiner

Primary Examiner—Mathieu D. Vargot
(74) Attorney, Agent, or Firm—Finnegan, Henderson, Farabow, Garrett & Dunner, L.L.P.

(57) ABSTRACT

A method of moulding and curing tires for vehicle wheels includes disposing a tire being worked on a rigid toroidal support having an outer surface the shape of which substantially matches an inner surface of the tire, closing the tire and rigid toroidal support in a moulding cavity defined by a vulcanization mould, pressing the outer surface of the tire against the moulding cavity walls, and administering heat to the tire in order to cause a molecular cross-linking of the tire. The pressing step takes place by admission of a fluid under pressure to at least one fluid-diffusion interspace between an outer surface of the rigid toroidal support and the inner surfaces of the tire. An apparatus for moulding and curing tires for vehicle wheels is also disclosed.

21 Claims, 3 Drawing Sheets

METHOD AND APPARATUS FOR MOULDING AND CURING TIRES FOR VEHICLE WHEELS

CROSS-REFERENCES TO RELATED APPLICATIONS

Applicant claims the right of priority under 35 U.S.C. § 119(a)–(d) based on patent application No. 98830473.9, filed Jul. 31, 1998, in the European Patent Office; additionally, Applicant claims the benefit under 35 U.S.C. § 119(e) based on prior-filed, copending provisional application No. 60/108,887, filed Nov. 17, 1998, in the U.S. Patent and Trademark Office; the contents of both of which are relied upon and incorporated herein by reference.

The present invention relates to a method for moulding and curing tyres for vehicle wheels, comprising the following steps: disposing a tire being worked on a toroidal support having an outer surface the shape of which matches that of an inner surface of the tire itself; closing the tire and the toroidal support in a moulding cavity defined by a vulcanization mould, said moulding cavity having walls conforming in shape to an outer surface of the tire when vulcanization has been completed; pressing the tire with its outer surface against the moulding cavity walls; administering heat to the tire being worked in order to cause a molecular cross-linking of same.

The present invention also relates to an apparatus for moulding and curing tires for vehicle wheels, comprising: a toroidal support arranged to engage a tire being worked, said toroidal support having an outer surface the shape of which matches that of an inner surface of the tire; a vulcanization mould arranged to receive the toroidal support carrying the tire being worked within a moulding cavity having walls conforming in shape to an outer surface of the tire when vulcanization has been completed; pressing means for pressing the outer surface of the tire against the moulding cavity walls; heating means for transmitting heat to the tire closed between the moulding cavity and the toroidal support.

In a tire production cycle it is provided that, subsequently to a manufacturing process in which the different tire components are made and/or assembled together, a moulding and curing process is carried out which aims at stabilizing the tire structure according to a desired geometric conformation, usually characterized by a particular tread pattern.

For the purpose, the tire is closed in a moulding cavity internally defined by a vulcanization mould and conforming in shape to the geometric configuration of the outer surfaces of the tire to be obtained.

In one of the most widely spread moulding methods it is provided that a vulcanization bladder of elastomer material filled with steam and/or another high-temperature and high-pressure fluid should be inflated within the tire closed in the moulding cavity. In this way, the tire is conveniently pushed against the inner walls of the moulding cavity and stabilized to the geometric conformation imposed to it, following the molecular cross-linking undergone by the elastomer material of which it is made, due to a supply of heat transmitted by the fluid through the bladder and by the mould walls.

Also known are moulding methods in which, instead of the inflatable vulcanization bladder, a rigid toroidal support is arranged within the tire, the shape of which matches that of the inner surface of the tire to be obtained.

Such a method is described in the European patent EP 242 840 for example, in which a rigid toroidal support is employed for imposing the final shape and sizes to the tire closed in the mould. In accordance with that which is described in this patent, the different coefficient of thermal expansion between the metallic toroidal support and the raw elastomer material of which the tire is made is utilized for achieving a suitable moulding pressure.

In conclusion, the assembly of the parts forming the mould and the toroidal support defines a closed interspace in the moulding cavity, which substantially has a shape conforming to the whole geometric configuration of the tire. In this way, both the outer surfaces and the inner surfaces of the tire are maintained in contact with rigid portions of the moulding and curing apparatus. In other words, all the apparatus parts intended to set up the final tire geometry are rigid parts, in contact with the methods using the inflatable vulcanization bladder which, as known, constitutes a deformable part of the mould.

It is however to point out that, at the present state of the art, both methods, i.e. that employing the inflatable vulcanization bladder and that employing a rigid toroidal support during tire vulcanization, have some problems.

With reference to the methods employing the inflatable bladder, it is in fact to note that the bladder deformability can easily give rise to geometric and/or structural imperfections in the tire, due to possible distortions to which the bladder itself may be submitted, owing to an unbalanced expansion and/or to friction phenomena generated between the outer surfaces of the bladder and the inner surfaces of the raw tire. Taking into account the fact that the bladder also has the task of locking the tire beads against the corresponding portions of the mould, the bladder deformability makes it difficult to achieve sufficient bead-locking pressures. Therefore an undesired out-of-alignment positioning of the beads relative to the geometric axis of the tire can occur, which will give rise to distortion of the whole tire structure. An insufficient bead-locking pressure, in addition, can give origin to formation of burr at the beads themselves, due to escape of elastomer material between the bladder and mould, above all at the starting instants of the curing process.

The vulcanization bladder needs use of great amounts of steam, due to the requirements of filling the whole inner volume of the bladder inflated in the mould cavity, and in addition it constitutes an obstacle to heat transmission to the tire by said steam.

On the other hand, use of a rigid toroidal support instead of the inflatable vulcanization bladder makes it necessary to carry out a very precise, and also very difficult, checking of the volumes of the material used in manufacturing the tire.

Furthermore, it is not presently possible to impose an appropriate radial and/or circumferential expansion to the tire, for achieving desired preloading effects in the reinforcing structures employed in manufacturing said tire.

Even with the aid of the rigid toroidal support, in addition, it is somewhat difficult to obtain a correct and efficient heat transmission to the inside of the tire.

The Applicant has envisaged the possibility of achieving important improvements in the processes for moulding and curing a tire with the aid of a rigid toroidal support, by carrying out admission of a heating fluid and/or another fluid under pressure, in accordance with the present invention, to an interspace defined between the inner surface of the tire and the outer surface of the toroidal support itself.

In particular, the invention relates to a method of moulding and curing tires for vehicle wheels, characterized in that said pressing step takes place by admission of a fluid under pressure (or pressurized fluid) to at least one fluid-diffusion interspace created between the outer surface of the toroidal support and the inner surface of the tire.

In more detail, the pressing step preferably takes place concurrently with an expansion imposed to the tire by effect of admitting fluid under pressure to the diffusion interspace.

Said radial expansion preferably involves an increase in the tire circumference included between 1.5% and 3.5%, measured at an equatorial plane of the tire itself.

The diffusion interspace, preferably having a size included between 3 mm and 14 mm, measured between the inner surface of the tire and the outer surface of the toroidal support at least at one equatorial plane of the tire itself, can be advantageously created following expansion of the tire.

In a preferential embodiment, admission of fluid under pressure takes place through feeding channels formed in the toroidal support and opening onto the outer surface of said support.

In addition, it is preferably provided that during admission of fluid under pressure the tire should be sealingly engaged at its inner circumferential edges between the moulding cavity walls and the outer surface of the toroidal support, for hermetically delimiting the diffusion interspace at the inner circumferential edges of the tire itself.

Advantageously, heat administration preferably takes place by admission of a heating fluid to said diffusion interspace.

This heating fluid may constitute, or at least may be part of the same fluid under pressure employed for carrying out the pressing step.

Conveniently, the step of arranging the tire on the toroidal support is carried out by manufacturing the tire directly on the toroidal support.

In accordance with a further aspect of the invention, to be utilized also independently of the presence of a rigid toroidal support, a pre-vulcanized liner is arranged on the inner surface of the tire.

Said pre-vulcanized liner can be advantageously directly formed on the toroidal support during a preliminary step of the tire manufacture on the toroidal support itself.

In more detail, formation of the pre-vulcanized liner preferably comprises the following steps: applying at least one layer of raw elastomer material to the outer surface of the toroidal support; transmitting heat to the elastomer layer to cause a molecular cross-linking of the latter.

Heat transmission to the elastomer layer can be obtained by heating the toroidal support.

Conveniently, heating of the toroidal support is at least partly obtained due to employment of the toroidal support itself in a preceding cycle for carrying out tire moulding and curing.

In accordance with the invention, said method is put into practice by an apparatus for moulding and curing tires for vehicle wheels, characterized in that said pressing means comprises channels for feeding of a fluid under pressure which are formed through the toroidal support and open onto the outer surface of said support.

In more detail, said feeding channels open into at least one interspace for diffusion of the fluid under pressure, defined between the outer surface of the toroidal support and the inner surface of the tire being worked.

Preferably, the outer surface of the toroidal support has an extension lower than that of the inner surface of the vulcanized tire, so that the diffusion interspace of the heating fluid is created between the outer surface of the toroidal support and the inner surface of the tire, due to expansion of said tire by effect of the thrust exerted thereon by the fluid under pressure.

It is also preferably provided that the toroidal support should have inner circumferential portions cooperating with inner circumferential portions of the walls of the moulding cavity for sealingly engaging the tire at the respective inner circumferential edges of the latter.

In a preferential solution of the invention the pressurized-fluid feeding channels extend from an annular cavity provided internally of the toroidal support and susceptible of connection with at least one primary duct for feeding of fluid under pressure, associated with the vulcanization mould.

Conveniently, the toroidal support has at least one centering shank to be engaged in a centering seat arranged in the mould for fastening positioning of the toroidal support and the tire in the moulding cavity.

Said centering shank for example extends in a geometric axis common to said toroidal support, said tire being worked, and said moulding cavity.

Also provided may be at least one connecting duct formed along the centering shank to bring the feeding channels into fluid communication with at least one primary duct for feeding of fluid under pressure.

According to a further feature of the invention, the heating means comprises at least one conduit for sending a heating fluid to the feeding channels.

The heating fluid may comprise the same fluid under pressure admitted by the pressurized-fluid feeding means.

Further features and advantages will become more apparent from the detailed description of a preferred, non-exclusive embodiment of a method and an apparatus for moulding and curing tires for vehicle wheels in accordance with the present invention.

This description is taken hereinafter with reference to the accompanying drawings, given by way of non-limiting example, in which:

FIG. 1 diagrammatically shows a diametrical section of an apparatus in accordance with the invention during the step of loading a tire being worked into a mould, arranged in an open condition;

Figure 1:
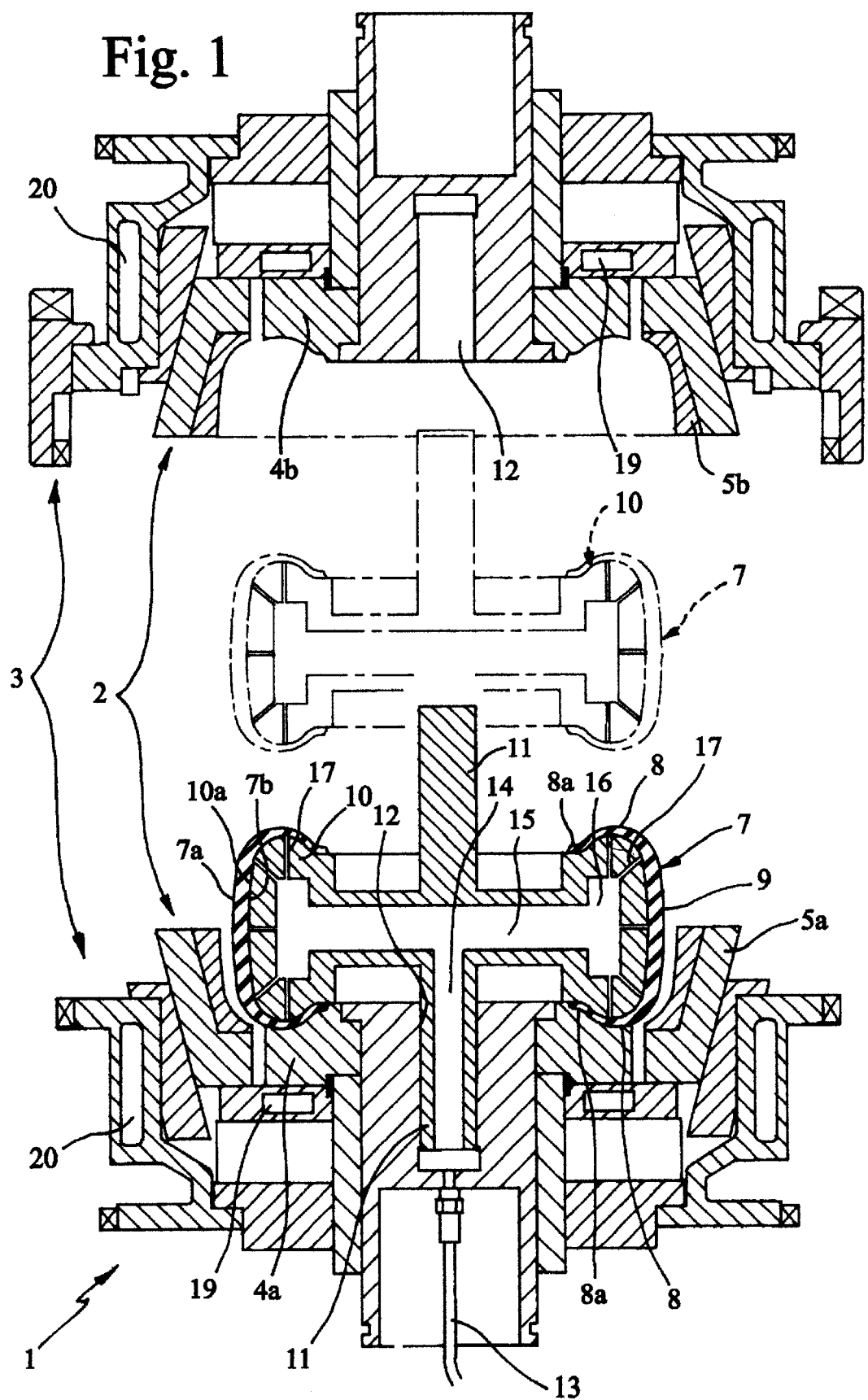

With reference to the drawings, an apparatus for moulding and curing tires for vehicle wheels in accordance with the present invention has been generally identified by reference numeral 1.

Apparatus 1 comprises a vulcanization mould 2 associated with a vulcanization press 3, only diagrammatically shown in that it can be made in any convenient manner as conceived by a person skilled in the art. For instance, mould 2 may be comprised of a lower mould half 2a and an upper mould half 2b in engagement with a bed 3a and a closing portion 3b of press 3, respectively.

In the example shown just as an indication, each of the lower 2a and upper 2b mould halves of mould 2 has a lower 4a and upper 4b cheek respectively, and a crown of lower 5a and upper 5b sectors.

Figure 2:
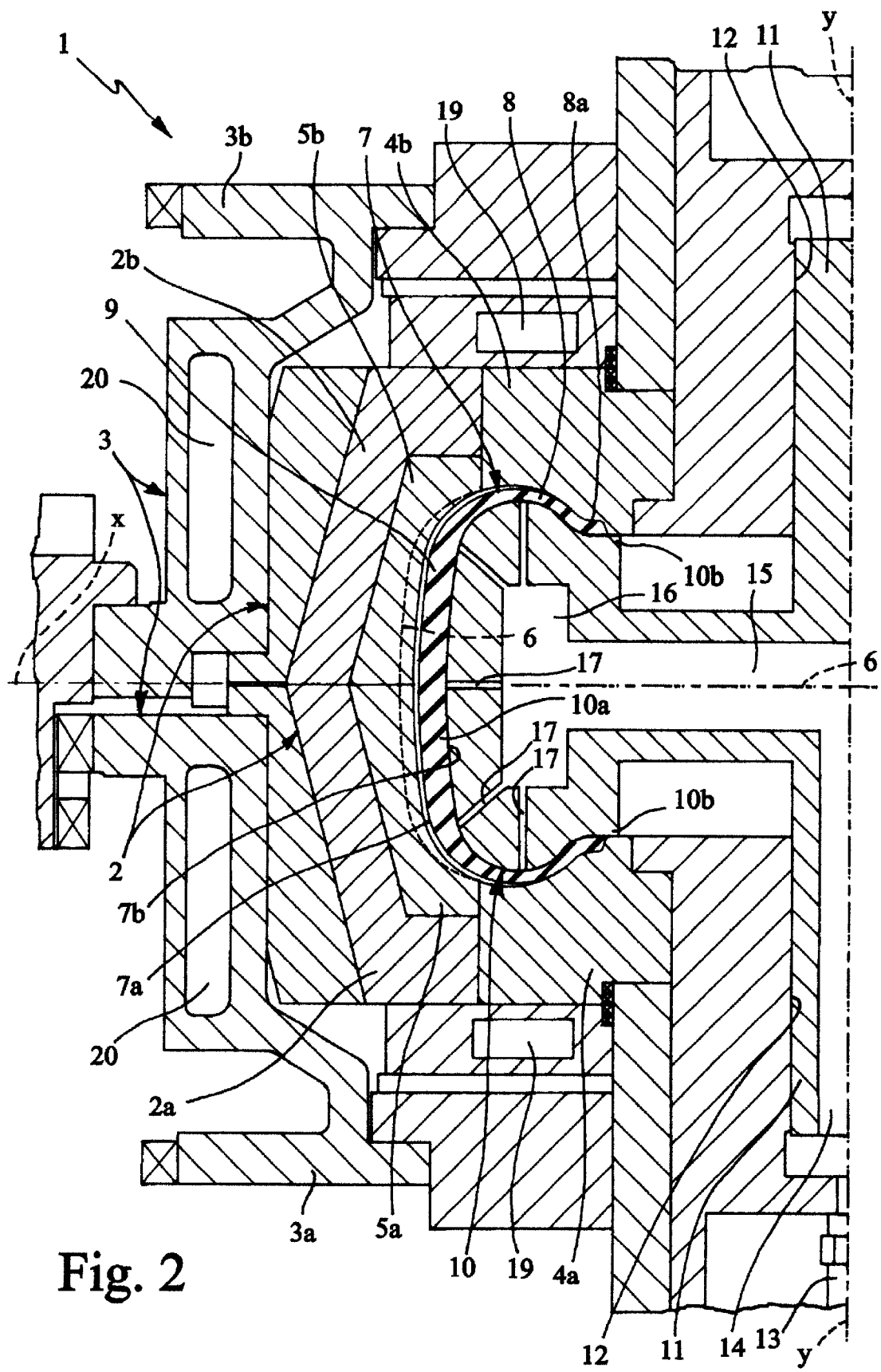
FIG. 2 is a fragmentary cross half-section, to an enlarged scale as compared with FIG. 1, showing the tire in a step coinciding with, or immediately after closing of the mould.
Figure 3:
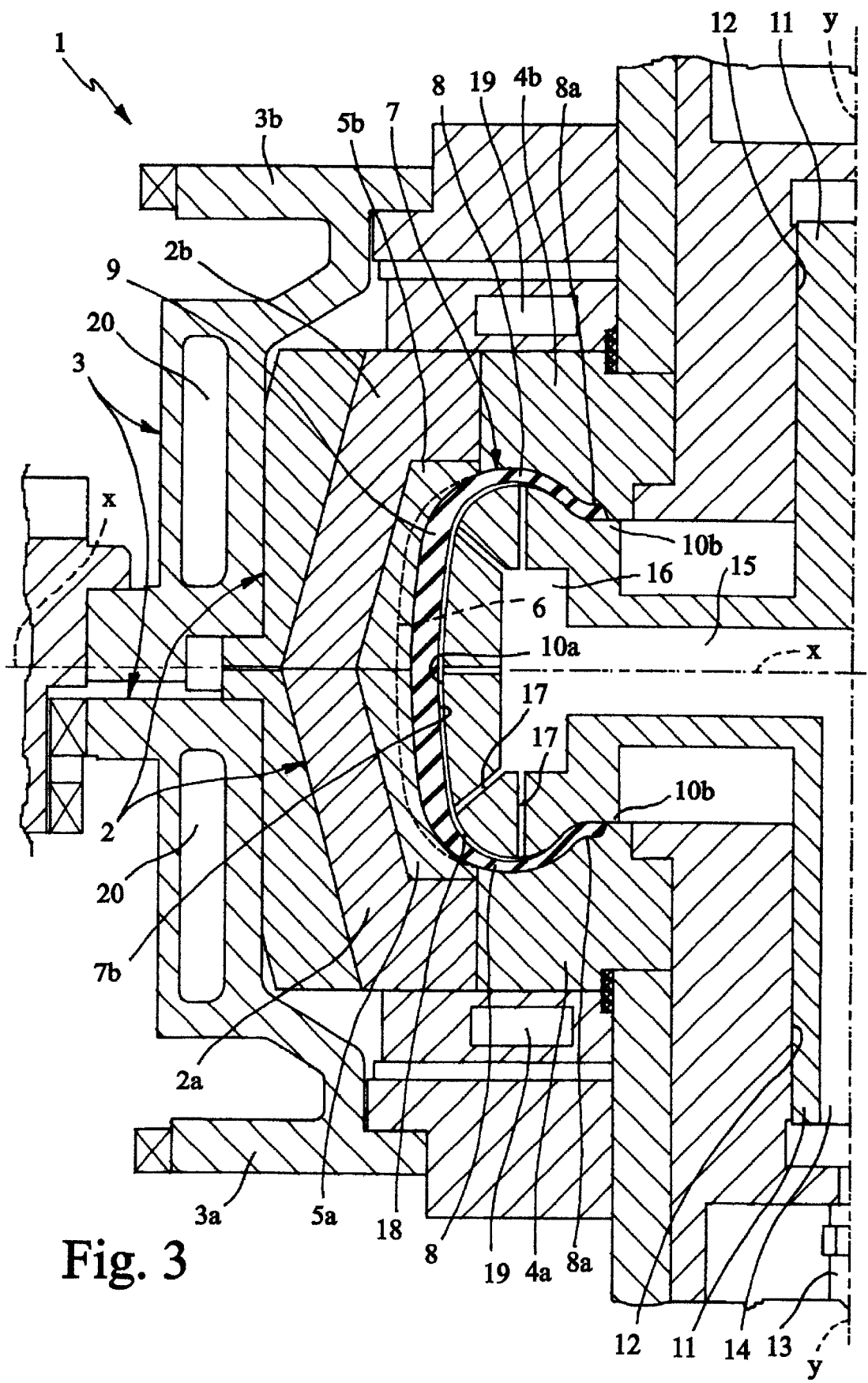
FIG. 3 is a cross half-section of the tire being moulded against the mould surfaces, following admission of steam under pressure through the toroidal support.

The lower 2a and upper 2b mould halves are movable relative to each other between an open condition in which they are mutually spaced apart as shown in FIG. 1, and a closed position, shown in FIGS. 2 and 3, in which they are disposed mutually close to each other for the purpose of forming a moulding cavity 6 the inner sides of which, defined by cheeks 3a, 3b and sectors 5a, 5b, reproduce the geometric conformation of the outer surface 7a of a tire 7 to be obtained.

In more detail, checks 4a, 4b are intended for forming the outer surfaces of the opposite sidewalls 8 of tire 7, whereas sectors 5a, 5b are intended for forming the so-called thread band 9 of the tire itself, creating a series of cuts and longitudinal and/or transverse grooves therein, suitably disposed according to a desired "tread pattern".

Apparatus 1 further provides for use of at least one toroidal support 10 of metal material or another solid material, having an outer surface substantially reproducing the shape of an inner surface of tire 7. The toroidal support 10 is conveniently made up of a collapsible drum, that is consisting of centripetally movable circumferential segments for dismantling the toroidal support itself and enabling easy removal of same from tire 7, when working has been completed.

In accordance with the method of the invention, the raw tire 7 is disposed on the toroidal support 10 before the latter is fitted, together with the tire itself, into the vulcanization mould 2 arranged in an open condition.

In particular, engagement of tire 7 on the toroidal support 10 can be conveniently obtained by directly manufacturing the tire on the support itself. In this way the toroidal support 10 is advantageously utilized as a rigid outline for forming and/or deposition of the different components, such as the carcass plies, bead-reinforcing structures, belt strips, sidewalls, and tread band for example, which components cooperate in forming the tire itself. Further details on the modalities of forming and/or deposition of the components of tire 7 on the toroidal support 10 can be taken from European patent applications No. 97830633.0 and No. 97830731.2 for example, in the name of the same Applicant.

Under this circumstance, the geometric conformation of the inner surface of the raw tire 7 will exactly correspond to the conformation of the outer surface of the toroidal support 10.

However, as better clarified in the following, it is preferably provided that the extension of the outer surface 10a of the toroidal support 10 should be conveniently lower than the extension of the inner surface 7b of tire 7 when vulcanization has been completed.

The toroidal support 10 is preferably provided with at least one centering shank 11 to be engaged in a centering seat 12 arranged in mould 2, for establishing a precise positioning of the toroidal support itself and the tire 7 carried thereon, within the moulding cavity 6. In the embodiment shown, the toroidal support 10 has two centering shanks 11 extending from opposite sides in a geometric axis Y common to the toroidal support 10, the tire 7 and the moulding cavity 6, and arranged for being fitted into corresponding centering seats 12 formed in the bed 3a and the closing portion 3b of the vulcanization press 3, respectively.

More particularly, coupling between each centering shank 11 of the toroidal support 10 and the corresponding centering seat 12 formed in mould 2 defines, between each cheek 4a, 4b of the mould itself and the corresponding inner circumferential edge 10b of the toroidal support 10, a housing seat for an inner circumferential edge 8a of tire 7, usually known as "bead" of the tire 7.

Said bead seats 4c, 4d give beads 8a a moulding of quite precise geometry and thickness, in that said moulding results from a direct coupling between the rigid surfaces of the toroidal support 10 and the surfaces of cheeks 4a, 4b of mould 2.

In addition, said bead seats 4c, 4d ensure an absolutely steady and precise centering of tire 7 relative to axis "Y" of the moulding cavity 6.

Preferably, the toroidal support 10 is also conveniently sized so as to have, at least at the regions corresponding to beads 8a of tire 7, an elastically yielding structure in an axial direction, due to mutual approaching of cheeks 4a, 4b during the closing step of mould 2.

The axial deformation undergone by the toroidal support 10 at the contact regions with cheeks 4a, 4b close to the tire beads 8a is preferably included between 0.3 and 0.5 mm, so as to generate a specific pressure included between 18 and 25 bars on the contact surfaces with the corresponding cheeks 4a, 4b. This contact pressure, during the moulding and curing step of tire 7, prevents any escape of elastomer material between the surfaces in mutual contact of the toroidal support 10 and of cheeks 4a, 4b, thereby avoiding formation of consequent burr.

When positioning of the toroidal support 10 with tire 7 on the lower portion 2a of mould 2 has been carried out, the mould itself is brought to its closed condition.

As can be viewed from FIG. 2, at the moment that mould 2 is closed, the walls of the moulding cavity 6 remain at a certain distance from the outer surface of tire 7, in particular at the tread band 9 of the latter. During this step, the tread band 9 can in any case be partly penetrated by the raised portions arranged on sectors 5a, 5b so as to define said tread pattern.

Still on closure of mould 2, each of the inner circumferential edges 8a of tire 7 is sealingly engaged between the inner circumferential portions of the toroidal support 10 and inner circumferential portions of the lower 4a and upper 4b cheeks. Tyre 7 will remain sealingly engaged in the mould in the above described manner until the moment that, at the end of the moulding and curing cycle, the mould itself will be brought again to its open condition.

When mould closure has been completed, tire 7 is submitted to a pressing step with its outer surface 7a against the walls of the moulding cavity 6, concurrently with administration of heat, so as to cause molecular cross-linking of the elastomer material forming the tire itself and consequent geometric and structural stabilization of the latter.

For the purpose, apparatus 1 is provided with pressing means comprising at least one primary duct 13 for feeding od a fluid under pressure, formed in bed 3a of press 2 for example, and opening into one of the centering seats 12 for sending a fluid under pressure to at least one connecting duct 14 formed along at least one of the centering shanks 11, preferably coaxially therewith.

The connecting duct 14 terminates, through appropriate branches 15 radially formed in the toroidal support 10, at an annular chamber 16 provided internally of the toroidal support itself.

Extending from the annular chamber 16, through the toroidal support 10, is a plurality of channels 17 for feeding of fluid under pressure, which open into the outer surface 10a of the toroidal support itself and are suitably distributed over the circumferential extension of said support.

The pressurized fluid fed from the primary duct 13 reaches the feeding channels 17 via the connecting duct 14, the radial branches 15 and the annular chamber 16, then opening onto the outer surface 10a of the toroidal support 10.

The pressurized fluid is thus admitted to a diffusion interspace 18 created between the outer surface 10a of the toroidal support 10 and the inner surface 7b of tire 7, into which the feeding channels 17 open.

In a preferential solution, the diffusion interspace 18 is directly created following an expansion of tire 7 caused by effect of the thrust exerted by the pressurized fluid.

In other words, pressing of the tire against the walls of the moulding cavity 6 takes place concurrently with an expansion imposed to the tire itself, until the outer surface 7a thereof is brought to completely adhere to the inner walls of the moulding cavity 6.

Alternatively, in accordance with a different embodiment, the diffusion interspace 18 is at least partly defined by a surface lowering formed on the outer surface 10a of the toroidal support 10. In this case as well, concurrently with the pressing step following admission of pressurized fluid, an expansion of tire 7 increasing volume of the diffusion interspace 18 can be achieved.

Preferably, the diffusion interspace 18 has a size included between 3 mm and 14 mm, measured between the inner surface 7b of tire 7 and the outer surface 10a of the toroidal support 10, at least close to an equatorial plane X—X of the tire itself.

It is also preferably provided that the amount of the expansion imposed to tire 7 should involve an increase in the circumference of same which is included between 1.5% and 3.5%, measured at the equatorial plane X—X of the tire itself.

The fluid under pressure admitted to the diffusion interspace 18 can be made up of nitrogen or another inert gas, for example.

However, in a preferential solution, it is provided that, in addition to or in place of an inert gas, preferably overheated steam should be employed, which will preferably have a temperature included between 170° C. and 210° C., and will be fed at a gradually increasing pressure until a value included between 16 and 30 bars, preferably of about 18 bars. Under this circumstance the heating fluid is made of, or at least comprises, the same fluid under pressure sent to the feeding channels 17, for tire moulding.

Said primary duct 13 and connecting duct 14, as well as the radial branches 15, annular chamber 16 and feeding channels 17, together with further conduits 19, 20 close to cheeks 4a, 4b and sectors 5a, 5b of mould 3 fed with steam under pressure at high temperature, also perform the function of heating means for the mould walls in order to supply tire 7, from the outside to the inside, with heat necessary for its molecular cross-linking.

In accordance with a further aspect of the invention, in order to inhibit steam under pressure, during the starting steps of the curing cycle, from permeating through the raw elastomer material of which tire 7 is made, the method in reference provides for arrangement of at least one pre-vulcanized liner on the inner surface of the tire. Advantageously, the pre-vulcanized liner (not shown in the drawings) can be directly formed on the toroidal support 10 during a step preceding manufacturing of tire 7 on the toroidal support itself, or applied to the outer surface 10a of the toroidal support 10 in the form of a skim coat.

Further specifications on the composition and features of the liner are described in a copending European patent application in the name of the same Applicant, to which please refer for further explanations.

The invention achieves important advantages.

In fact, the possibility of directly manufacturing the tire on a rigid toroidal support ensures high qualities in terms of geometric accuracy and structural uniformity of the tire itself.

Employment of a rigid toroidal support during the moulding and curing steps enables a perfect centering of the tire within the vulcanization mould to be achieved, and allows a greater control on the geometric and structural features of the tire during the expansion step, as compared with traditional processes using inflatable vulcanization bladders. This geometric and structural control is also assisted by an efficient anchoring of beads 8a between the cheeks 4a, 4b and the toroidal support 10, as previously described, without any risk of forming burr due to escape of elastomer material therethrough.

In addition, admission of steam under pressure and at temperature to the diffusion interspace formed between the toroidal support and the inner surface of the tire, ensures a greater heat transmission to the tire itself, which is not hindered by bodies of elastomer material such as the vulcanization bladders of the known art, and is more efficient than that obtainable by contact with solid bodies such as the toroidal support itself.

It is also to note that, due to the presence of the toroidal support, the volume taken up by steam within the tire is very reduced. Consequently, vulcanization can be obtained with greatly reduced amounts of steam as compared with the known art.

Admission of steam or another fluid under pressure between the toroidal support and the inner surface of the tire further enables, with a possible tire expansion, convenient preloading forces to be produced in the inner tire-reinforcing structures, which condition is often sought for achieving given behavioural qualities.

In addition, arrangement of a pre-vulcanized elastomer layer on the inner surface of the tire eliminates the risk that the direct contact of steam with the inner surfaces of the tire may cause diffusion of water particles into the layers of the raw blend, above all in the starting steps of the curing process.

This solution can be also advantageously utilized in any curing process carried out without the aid of a vulcanization bladder, even in the absence of the toroidal support.

What is claimed is:

1. A method of moulding and curing tires for vehicle wheels, comprising the steps of:

directly manufacturing a tire on a rigid toroidal support having an outer surface a shape of which substantially matches an inner surface of the tire;

closing the tire and the rigid toroidal support in a moulding cavity defined by a vulcanization mould, the moulding cavity having walls conforming in shape to an outer surface of the tire when vulcanization has been completed;

pressing the outer surface of the tire against the moulding cavity walls; and administering heat to the tire in order to cause a molecular cross-linking of the tire;

wherein the pressing step takes place concurrently with an expansion imposed to the tire by admission of a fluid under pressure to at least one fluid-diffusion interspace between the outer surface of the rigid toroidal support and the inner surface of the tire, the fluid under pressure passing through feed channels in the rigid toroidal support and opening onto the outer surface of the rigid toroidal support.

2. The method of claim 1, wherein the at least one fluid-diffusion interspace is created as a result of an expansion of the tire.

3. The method of claim 1, wherein admission of the fluid under pressure takes place through feeding channels formed in the rigid toroidal support and opening onto the outer surface of the rigid toroidal support.

4. The method of claim 1, wherein during admission of the fluid under pressure, the tire is sealingly engaged at inner circumferential edges of the tire between the moulding cavity walls and the outer surface of the rigid toroidal support, for hermetically delimiting the at least one fluid-diffusion interspace at the inner circumferential edges of the tire.

5. The method of claim 1, wherein the step of administering heat takes place by admission of a heating fluid to the at least one fluid-diffusion interspace.

6. The method of claim 5, wherein the heating fluid comprise a same fluid under pressure as employed for carrying out the pressing step.

7. The method of claim 1, wherein the at least one fluid-diffusion interspace has a size included between 3 mm and 14 mm, measured between the inner surface of the tire and the outer surface of the rigid toroidal support at least close to an equatorial plane of the tire.

8. The method of claim 1, wherein the expansion involves an increase in a circumference of the tire included between 1.5% and 3.5% measured at an equatorial plane of the tire.

9. The method of claim 1, wherein a pre-vulcanized liner is arranged on the inner surface of the tire.

10. The method of claim 9, wherein the pre-vulcanized liner is directly formed on the rigid toroidal support during a preliminary manufacturing step of the tire on the rigid toroidal support.

11. An apparatus for moulding and curing tires for vehicle wheels, comprising:
   a rigid toroidal support upon which a tire being worked is directly manufactured, the rigid toroidal support having an outer surface a shape of which substantially matches an inner surface of the tire;
   a vulcanization mould arranged to receive the rigid toroidal support carrying the tire within a moulding cavity having walls conforming in shape to an outer surface of the tire when vulcanization has been completed;
   pressing means for pressing the outer surface of the tire against the moulding cavity walls; and
   heating means for transmitting heat to the tire closed between the moulding cavity and the rigid toroidal support;
   wherein the pressing means comprises channels for feeding of a fluid under pressure formed through the rigid toroidal support and opening onto the outer surface of the rigid toroidal support.

12. The apparatus of claim 11, wherein the feeding channels open into at least one interspace for diffusion of the fluid under pressure, defined between the outer surface of the rigid toroidal support and the inner surface of the tire.

13. The apparatus of claim 11, wherein the outer surface of the rigid toroidal support has an extension lower than that of the inner surface of the tire, so that an interspace for diffusion of the fluid under pressure is created between the outer surface of the rigid toroidal support and the inner surface of the tire.

14. The apparatus of claim 11, wherein the rigid toroidal support has inner circumferential portions cooperating with inner circumferential portions of the moulding cavity walls for sealingly engaging the tire at respective inner circumferential edges of the tire.

15. The apparatus of claim 11, wherein the feeding channels extend from an annular cavity provided internally of the rigid toroidal support and connectable with a primary duct associated with the vulcanization mould, for feeding of the fluid under pressure.

16. The apparatus of claim 11, wherein the rigid toroidal support has at least one centering shank to be engaged in a centering seat associated with the vulcanization mould for positioning of the rigid toroidal support and the tire in the moulding cavity.

17. The apparatus of claim 16, wherein the at least one centering shank extends in a geometric axis common to the rigid toroidal support, the tire, and the moulding cavity.

18. The apparatus of claim 16, further comprising at least one connecting duct formed along the at least one centering shank to bring the feeding channels into fluid communication with a primary duct for feeding of the fluid under pressure.

19. The apparatus of claim 11, wherein the heating means comprises at least one conduit for sending a heating fluid to the feeding channels.

20. The apparatus of claim 19, wherein the heating fluid comprises a same fluid under pressure admitted by the feeding channels.

21. The apparatus of claim 11, wherein the rigid toroidal support has an elastically yielding structure in an axial direction, at least at regions corresponding to inner circumferential edges of the tire.

* * * * *

UNITED STATES PATENT AND TRADEMARK OFFICE
CERTIFICATE OF CORRECTION

PATENT NO. : 6,332,999 B1 Page 1 of 1
DATED : December 25, 2001
INVENTOR(S) : Renato Caretta It is certified that error appears in the above-identified patent and that said Letters Patent is hereby corrected as shown below:

<u>Title page,</u>
Item [57], ABSTRACT,
Line 12, "surfaces of" should read -- surface of --.

<u>Column 9,</u>
Line 19, "comprise a" should read -- comprises a --.

Signed and Sealed this

Twenty-seventh Day of August, 2002

*Attest:*

*Attesting Officer*

JAMES E. ROGAN
*Director of the United States Patent and Trademark Office*